United States Patent
Ali et al.

(10) Patent No.: US 10,348,184 B2
(45) Date of Patent: Jul. 9, 2019

(54) POWER SYSTEM AND AN ASSOCIATED METHOD THEREOF

(71) Applicant: General Electric Company, Schenectady, NY (US)

(72) Inventors: Shahid Ali, Bangalore (IN); Ajith Kuttannair Kumar, Erie, PA (US); Govardhan Ganireddy, Roanoke, VA (US); Prashanth Manikumar Chennamsetty, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 15/675,845

(22) Filed: Aug. 14, 2017

(65) Prior Publication Data

US 2019/0052166 A1 Feb. 14, 2019

(51) Int. Cl.
*H02M 1/12* (2006.01)
*H02M 7/539* (2006.01)
(Continued)

(52) U.S. Cl.
CPC ............ *H02M 1/12* (2013.01); *H02M 7/539* (2013.01); *H02M 7/23* (2013.01); *H02M 7/493* (2013.01); *H02M 2001/0025* (2013.01)

(58) Field of Classification Search
CPC .............. H02M 3/1584; H02M 3/285; H02M 3/33561; H02M 7/49; H02M 1/045; H02M 7/068; H02M 7/153; H02M 7/06; H02M 7/10; H02M 1/088; H02M 7/103; H02M 7/106; H02M 7/19; H02M 7/08;
(Continued)

(56) References Cited

U.S. PATENT DOCUMENTS

| 8,421,266 | B2 | 4/2013 | Kumar |
| 8,772,962 | B2 | 7/2014 | Kumar |

(Continued)

FOREIGN PATENT DOCUMENTS

WO 2013143762 A2 10/2013

OTHER PUBLICATIONS

Purhonen, "Minimizing circulating current in parallel-connected photo voltaic inverters", Thesis for the degree of Doctor of Science, ISSN 1456-4491, 105 Pages, 2014.
(Continued)

*Primary Examiner* — Nguyen Tran
(74) *Attorney, Agent, or Firm* — Christopher R. Carroll; The Small Patent Law Group LLC

(57) ABSTRACT

A power system is presented. The power system includes a first converter including a first output terminal a first control unit coupled to the first converter, a second converter including a second output terminal, where the second converter is coupled in parallel to the first converter, and a second control unit coupled to the second converter. The second control unit is configured to measure a plurality of phase currents at the second output terminal, determine a harmonic current transmitted by the second converter based on single phase current of the plurality of measured phase currents, and change a time-period of at least one switching cycle of a carrier wave of the second converter based on the determined harmonic current to synchronize with a carrier wave of the first converter.

19 Claims, 4 Drawing Sheets

(51) Int. Cl.
*H02M 7/23* (2006.01)
*H02M 7/493* (2007.01)
*H02M 1/00* (2006.01)

(58) Field of Classification Search
CPC ........ H02M 7/17; H02M 1/12; H02M 1/4266;
H02M 2001/123; H02M 1/14; H02M
7/5395; H02J 3/46; H02J 3/38; H02J 3/01
USPC .......................................................... 307/82
See application file for complete search history.

(56) References Cited

U.S. PATENT DOCUMENTS

| | | | |
|---|---|---|---|
| 8,964,432 | B2 | 2/2015 | Tang et al. |
| 9,236,791 | B2 | 1/2016 | Kumar et al. |
| 2009/0003020 | A1* | 1/2009 | Zhang ................ H02M 1/32 363/65 |
| 2012/0243274 | A1 | 9/2012 | Feng et al. |
| 2013/0229836 | A1* | 9/2013 | Wang ................ H02M 1/12 363/40 |
| 2014/0139016 | A1 | 5/2014 | Lovercheck et al. |
| 2015/0131345 | A1 | 5/2015 | Purhonen et al. |
| 2016/0079758 | A1* | 3/2016 | Pan ................ H02J 3/383 307/82 |
| 2016/0144871 | A1 | 5/2016 | Jalla |
| 2016/0185360 | A1 | 6/2016 | Jalla |
| 2016/0248315 | A1* | 8/2016 | Basic ................ H02M 1/12 |
| 2016/0329832 | A1 | 12/2016 | Aeloiza et al. |

OTHER PUBLICATIONS

Shen et al., "Active DC-link Capacitor Harmonic Current Reduction in Two-Level Back-to-Back Converter", IEEE Transactions on Power Electronics, vol. 31, pp. 6947-6954, 2015.

* cited by examiner

POWER SYSTEM AND AN ASSOCIATED METHOD THEREOF

BACKGROUND

Embodiments of the present invention generally relate to power systems and more specifically to a power system and a method for reducing a high frequency circulating harmonic current flowing between a plurality of converters of the power system.

Power systems, such as solar based power system, wind based power system and the like include a plurality of converters connected in parallel to each other, for example. The power system typically includes a plurality of inductors and a plurality of capacitors coupled to each of the plurality of converters. High frequency circulating harmonic current flows between the plurality of converters due to a low value of impedance of a resonant path formed by the plurality of capacitors and the plurality of inductors. As a result, stress on power semiconductor devices employed in the plurality of converters and cables is increased.

Currently, different techniques have been employed to limit the circulating current between the multiple converters. Typically, a current limiting reactor having a high inductance value is connected to each of the converters for limiting the circulating current. Use of the current limiting reactors corresponding to each converter increases the cost and footprint of the power system. In recent times, a high speed communication network is used to communicatively couple the multiple converters to each other to limit the circulating current. The use of the high speed communication network compromises a reliability of the power system.

Accordingly, there is a need for an enhanced power system and a method for reducing high frequency circulating harmonic current between converters of the power system.

BRIEF DESCRIPTION

In accordance with one embodiment of the present invention, a power system is presented. The power system includes a first converter including a first output terminal, a first control unit coupled to the first converter, a second converter including a second output terminal, where the second converter is coupled in parallel to the first converter; and a second control unit coupled to the second converter. The second control unit is configured to measure a plurality of phase currents at the second output terminal, determine a harmonic current transmitted by the second converter based on single phase current of the plurality of measured phase currents, and change a time-period of at least one switching cycle of a carrier wave of the second converter based on the determined harmonic current to synchronize with a carrier wave of the first converter.

In accordance with another embodiment of the present invention, a method for operating a power system including a first converter including a first output terminal and a second converter including a second output terminal, where the first converter is coupled to a first control unit and the second converter is coupled to a second control unit is presented. The method includes measuring a plurality of phase currents at the second output terminal, by the second control unit. The method further includes determining a harmonic current transmitted by the second converter based on a single phase current of the plurality of measured phase currents, by the second control unit and changing a time-period of at least one switching cycle of a carrier wave of the second converter, by the second control unit, based on the determined harmonic current to synchronize with a carrier wave of the first converter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term operatively coupled as used herein includes wired coupling, wireless coupling, electrical coupling, magnetic coupling, radio communication, software based communication, or combinations thereof.

As will be described in detail hereinafter, various embodiments of an exemplary power system and a method of operating the power system are disclosed. The exemplary embodiments of the power system and the method of operation of the power system discloses reducing circulating current in the power system. The exemplary power system may be an uninterruptible power supply (UPS) based power system, a battery based power system, a solar based power system, a wind based power system, a mobile asset power system, any other renewable energy based power system, and the like. In one embodiment, the mobile asset power system is a locomotive power system.

Figure 1:
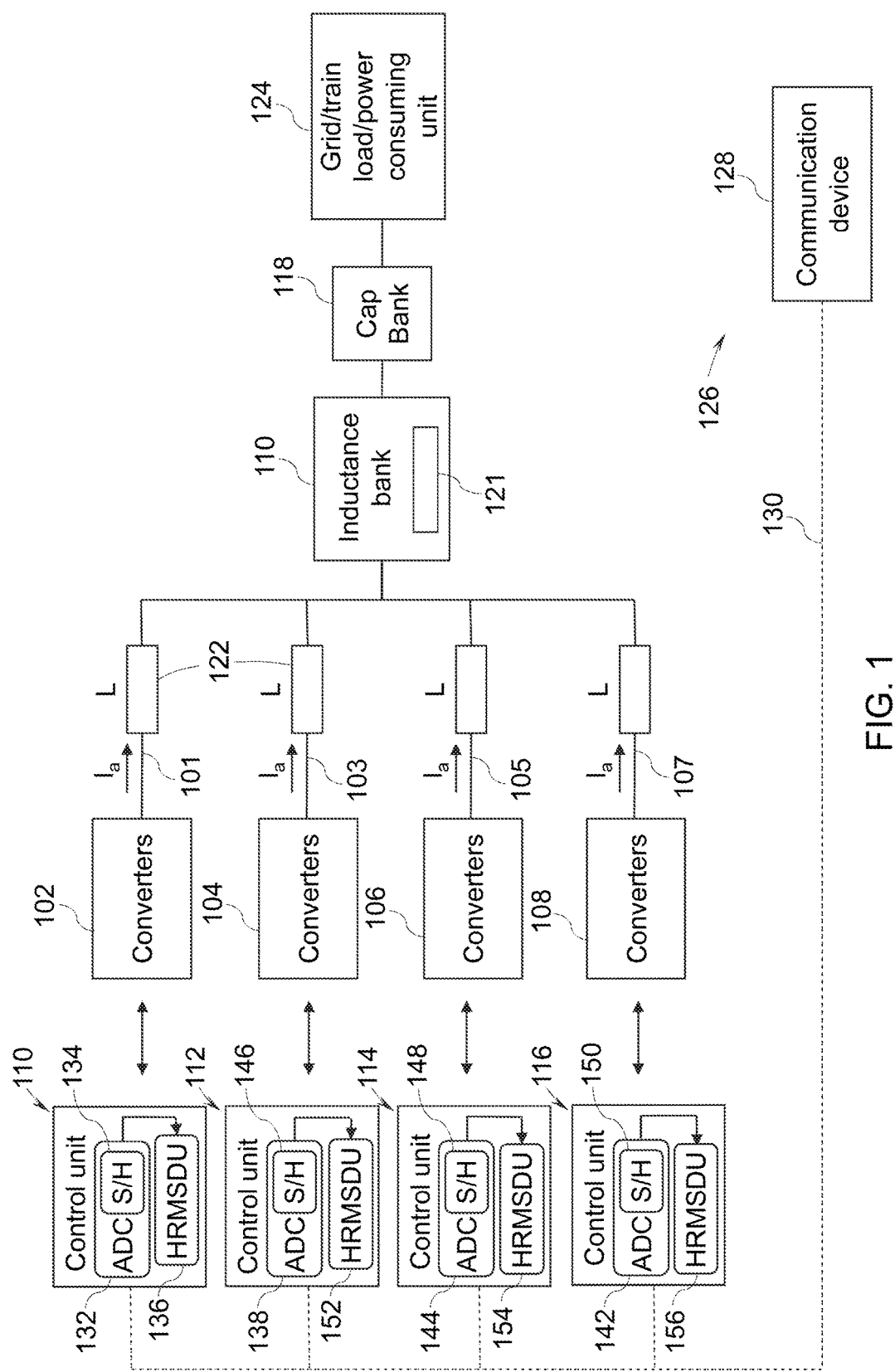
FIG. 1 is a block diagram of a power system in accordance with certain embodiments of the present invention.

Turning now to the drawings and by way of example in FIG. 1, a block diagram of a power system 100 in accordance with certain embodiments of the present invention is depicted. The power system 100 includes a first converter 102, a second converter 104, a third converter 106, and a fourth converter 108. In one embodiment, each among the first converter 102, the second converter 104, the third converter 106, and the fourth converter 108 is an inverter. The first converter 102, the second converter 104, the third converter 106, and the fourth converter 108 are coupled to each other in parallel.

The first converter 102, the second converter 104, the third converter 106, and the fourth converter 108 include a first output terminal 101, a second output terminal 103, a third output terminal 105, a fourth output terminal 107, respectively. Each output terminal provides a plurality of currents where each of the currents may correspond to one phase.

In the illustrated embodiment, the first converter 102, the second converter 104, the third converter 106, and the fourth converter 108 are coupled to a first control unit 110, a second control unit 112, a third control unit 114, and a fourth control unit 116, respectively. The operation of the first converter 102, the second converter 104, the third converter 106, and the fourth converter 108 are controlled by the first control unit 110, the second control unit 112, the third control unit 114, and the fourth control unit 116, respectively. The term "operation of the converters," as used herein, refers to switching of switches of the converters 102, 104, 106, 108 to generate a desired output voltage or current.

In certain embodiments, each of the first, second, third and fourth control units 110, 112, 114, 116 includes one or more processors (not shown in FIG. 1). The processors perform the functions of the control units. As used herein, the term "control unit" refers to integrated circuits referred to in the art as being included in a computer, a controller, a microcontroller, a microcomputer, a programmable logic controller (PLC), a specification specific integrated circuit, specification-specific processors, digital signal processors (DSPs), Application Specific Integrated Circuits (ASICs), Field Programmable Gate Arrays (FPGAs), and/or any other programmable circuits.

In the illustrated embodiment, the power system 100 further includes a capacitor bank 118 and an inductance bank 120. The capacitor bank 118 and the inductance bank 120 are centralized units. The term "centralized unit," as used herein, refers to an unit which is coupled to the plurality of converters 102, 104, 106, 108 of the power system 100. The capacitor bank 118 and the inductance bank 120 forms a LC filter. The LC filter enables to filter the harmonic content.

In the illustrated embodiment, specifically, the first, second, third, and fourth converters 102, 104, 106, 108 are coupled to the capacitor bank 118 and the inductance bank 120. The capacitor bank 118 includes a plurality of capacitors (not shown in FIG. 1). In one embodiment, the inductance bank 120 may include at least one first inductor 121. Second inductors 122 are coupled to the first, second, third, and fourth output terminals 101, 103, 105, 107 respectively. In one embodiment, the second inductors 122 facilitate to limit the high frequency harmonic current.

In another embodiment, the second inductors 122 may have a lower value if the converters 102, 104, 106, 108 are synchronized with respect to each other. In an embodiment where the second inductors 122 have a lower value since the converters 102, 104, 106, 108 are synchronized with respect to one another, the first inductors 121 need to be employed. Alternatively, if the second inductors 122 have a higher value, then value of inductance of the first inductors 121 may be negligible or may have a low value.

In the illustrated embodiment, the first, second, third, and fourth converters 102, 104, 106, 108 are coupled to the load 124 via the capacitor bank 118, the inductance bank 120, and the plurality of second inductors 122. The load 124 includes at least one of a grid, any power consuming unit, and a mobile asset load, such as a train load.

In yet another embodiment, the power system 100 includes a plurality of voltage and current sensors (not shown in FIG. 1). The plurality of voltage and current sensors are couple to the first converter 102, the second converter 104, the third converter 106, and the fourth converter 108. The plurality of voltage and current sensors are used to measure voltage and current, respectively, of each of the first, second, third, and fourth converters 102, 104, 106, 108.

Additionally, the power system 100 includes a communication network 126. The communication network 126 includes a communication device 128 coupled to the first, second, third and fourth control units 110, 112, 114, 116 via a communication channel 130. In one embodiment, the communication device 128 may be a router. In one embodiment, the communication channel 130 may be a wired channel or a wireless channel. The communication network 126 is at least one of a global positioning system (GPS) based communication network, a wireless based communication network, and a local area network (LAN). In an embodiment having only two converters, the communication network 126 may not be employed.

The communication network 126 transmits a plurality of time-instances to each of the first, second, third and fourth control units 110, 112, 114, 116. For example, during an initial state, a time instance, such as 9:01 AM is transmitted to each of the first, second, third and fourth control units 110, 112, 114, 116. Subsequently, for example, after 10 minutes, another time instance, such as 11 AM is transmitted to each of the first, second, third and fourth control units 110, 112, 114, 116.

It may be noted that each of the first, second, third and fourth control units 110, 112, 114, 116 include a corresponding crystal oscillator. The crystal oscillator of each of the first, second, third and fourth control units 110, 112, 114, 116 operate at different frequencies. In one embodiment, a ratio of the frequency of the first control unit 110 and the frequency of the second control unit 112 may be about 1/1000. Hence, even if we transmit at a time instance, such as 9:01 AM, after 10 minutes, each of the control units 110, 112, 114, 116 may have a different reference time. Therefore, the plurality of time instances need to be transmitted to each of the first, second, third and fourth control units 110, 112, 114, 116 in order to have a common reference time at all time instances. In an embodiment where the crystal oscillators of each of the first, second, third and fourth control units 110, 112, 114, 116 operate at a same frequency, only a single time-instance need to be transmitted to each of the first, second, third and fourth control units 110, 112, 114, 116.

In one embodiment, the communication network 126 may be a low speed communication network. The term "low speed communication network," as discussed herein, refers to a communication network where a time resolution of transmission of the plurality of time-instances is less than the switching frequencies of the first, second, third, and fourth converters 102, 104, 106, 108. The term "time resolution," as discussed herein, refers to a frequency of transmission of the plurality of time-instances to the first, second, third and fourth control units 110, 112, 114, 116. In one embodiment, the time resolution of transmission of the plurality of time-instances is about 100 times less than the switching frequencies of the first, second, third, and fourth converters 102, 104, 106, 108.

Furthermore, each of the first, second, third and fourth control units 110, 112, 114, 116 include an analog to digital converter (ADC) coupled to a corresponding harmonic roc mean square determination unit (HRMSDU). Each ADC includes a single sample and hold (S/H) circuit. Use of the single S/H circuit for sequential sampling currents instead of using a plurality of sample and hold circuits for simultaneously sampling the currents facilitates to reduce the electronics associated with the ADC. In one embodiment, the ADC may include sigma/delta converters, voltage controlled oscillators (VCOs), and the like.

In the embodiment of FIG. 1, the first control unit 110 includes a first ADC 132 coupled to the first HRMSDU 136. In a similar manner, the second, third, and fourth control units 112, 114, 116 include a second ADC 138, a third ADC 140, and a fourth ADC 142, respectively. In one embodiment, the first, second, third, and fourth control units 110, 112, 114, 116 include a first, second, third, and fourth S/H circuit 134, 146, 148, 150, respectively. The second ADC 138 is coupled to a second HRMSDU 152. In a similar manner, the third ADC 140 is coupled to a third HRMSDU 154, and the fourth ADC 150 is coupled to a fourth HRMSDU 156.

The first control unit 110 samples currents of the first output terminal 101. Particularly, the first S/H circuit 134 sequentially samples different phases currents of the first output terminal 101. The term "sequentially sampled current," as used herein, refers to sampling current one after another at different instants of time. In one embodiment, the different phase currents of the first output terminal 101 are sampled one after another. Although, the first S/H circuit 134 sequentially samples different phase currents of the first output terminal 101, current of only one phase of the first output terminal 101, such as current $I_a$, is used by the first HRMSDU 136 for determining a value of the high frequency circulating harmonic current transmitted by the first converter 102. The current of only one phase may be alternatively referred as single phase current. In one embodiment, all the sampled phase currents of the first output terminal 101 are used for control of power flow in the power system 100.

In one embodiment, if current $I_a$ is transmitted to the first HRMSDU 136, the RMS value of the harmonic component of the current $I_a$ is determined. The harmonic component of the current $I_a$ may be referred as a first high frequency circulating harmonic current. In particular, the first HRMSDU 136 determines the first high frequency circulating harmonic current transmitted by the first converter 102. It should be noted herein that the terms 'high frequency harmonic current,' 'high frequency circulating harmonic current,' and 'harmonic current' may be used interchangeably in the current specification. In one embodiment, the harmonic component of the current $I_a$ may be represented as $I_{ah}$, where $$I_{ah} = \sqrt{(I_{aRMS}^2 - I_{a\_fundamentalRMS})}$$

where, $I_{a\_fundamentalRMS}$ is a RMS value of fundamental component of the current $I_a$ and $I_{aRMS}$ is the RMS value of a combination of fundamental component of current $I_a$ and all the corresponding harmonics.

In a similar manner, in one embodiment, the second control unit 112 sequentially samples currents of the second output terminal 103, the third control unit 114 sequentially samples currents of the third output terminal 105, and the fourth control unit 116 sequentially samples currents of the fourth output terminal 107. Similarly, the second HRMSDU 152 determines the second high frequency circulating harmonic current transmitted by the second converter 104. In a similar manner, the third and fourth HRMSDUs 154, 156 determine the third and fourth high frequency circulating harmonic current transmitted by the third and the fourth converters 106, 108, respectively.

As noted hereinabove, the first, second, third and fourth control units 110, 112, 114, 116, control operation of the first, second, third, and fourth converters 102, 104, 106, 108, respectively. Accordingly, the first, second, third and fourth control units 110, 112, 114, 116 generate carrier waves for performing pulse width modulation of the first, second, third, and fourth converters 102, 104, 106, 108. The carrier waves used for pulse width modulation of the first, second, third, and fourth converters 102, 104, 106, 108 may be referred to as first, second, third, and fourth carrier waves, respectively.

In certain scenarios, carrier waves of converters are not synchronized with respect to each other. The unsynchronized carrier waves result in flow of high frequency circulating harmonic current between the converters. Hence, in order to limit the circulation of the high frequency circulating harmonic current, the carrier waves of the converters need to be synchronized.

In accordance with the exemplary embodiment of the present invention, a time-period of at least one switching cycle of the first, second, third, and fourth carrier waves is controlled based on at least one operational parameter and the determined harmonic current. In one embodiment, the time-period of the at least one switching cycle of the first carrier wave is changed for a determined time interval for shifting of a frequency of the first carrier wave. In a similar manner, the time-period of the at least one switching cycle of the second, third, and fourth carrier waves are changed for a determined time interval for shifting of a frequency of the second, third, and fourth carrier waves, respectively. As a result, the phase of the first, second, third, and fourth carrier waves are synchronized with respect to each other. In this embodiment, the first, second, third, and fourth carrier waves are synchronized with respect to each other without having a high-speed communication network between the first, second, third and fourth control units 110, 112, 114, 116. Avoiding use of the high-speed communication network facilitates to reduce cost and improve reliability of the power system 100. Thereby, the high frequency circulating harmonic current flowing at the output terminals of the first, second, third, and fourth converters 102, 104, 106, 108 is reduced. The method of synchronization of the first, second, third, and fourth carrier waves will be explained in greater detail with respect to FIGS. 3 and 4.

In another embodiment, the ADC coupled to the HRMSDU may be replaced by a tuned analog circuit coupled to an ADC. The tuned analog circuit determines the harmonic current based on current of only one phase of the output terminal. Further, the harmonic current determined by the tuned analog circuit may be sampled by the ADC and provided to the corresponding control unit. In one embodiment, the tuned analog circuit coupled to the ADC may be integral to a control unit. In another embodiment, the tuned analog circuit coupled to the ADC may disposed separately.

Although the illustrated embodiment shows four converters, number of converters in the power system 100 may vary depending on the application.

Figure 2:
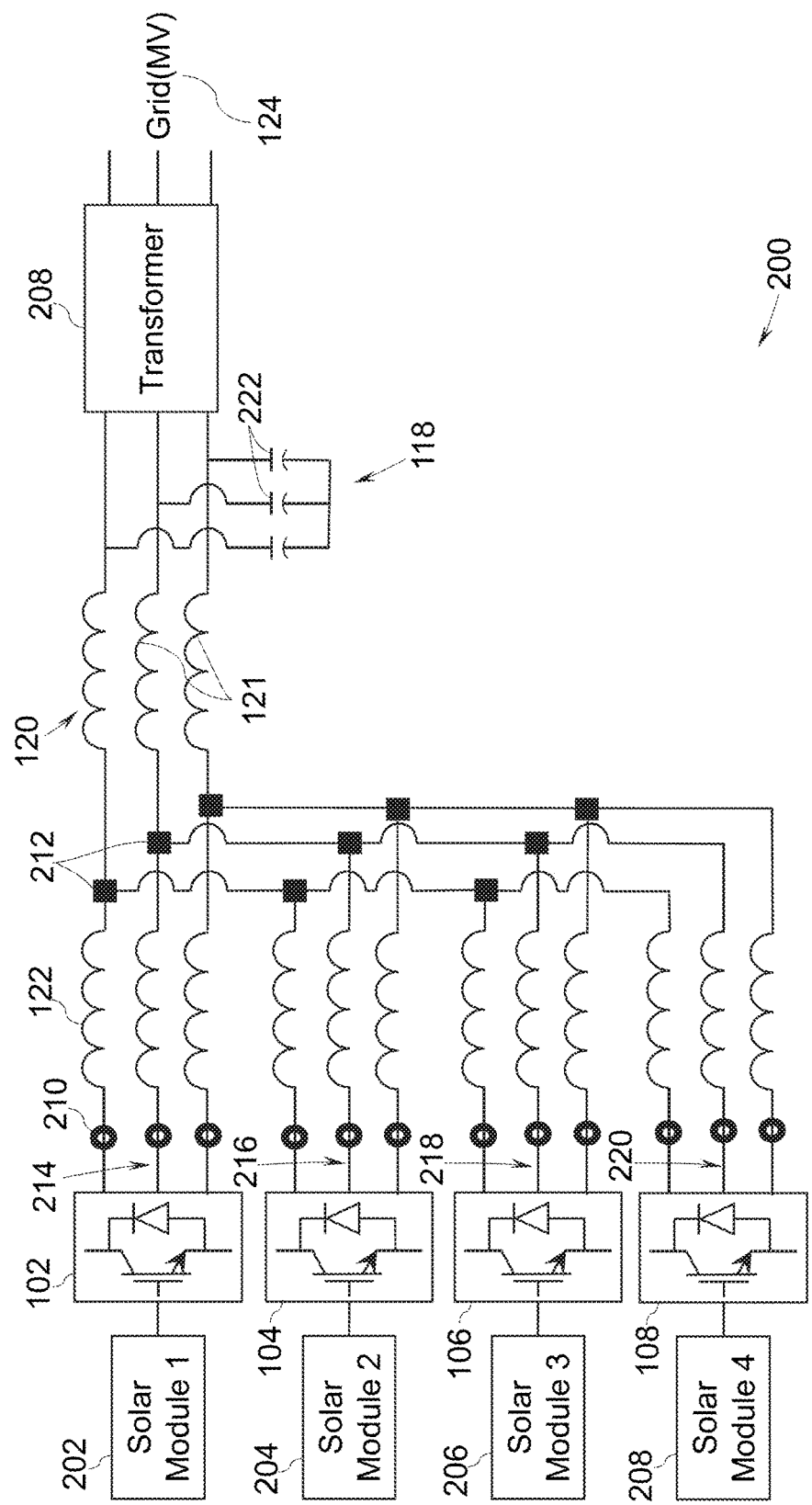
FIG. 2 is a diagrammatical representation of a power system in accordance with another embodiment.

FIG. 2 is a diagrammatical representation of a power system 200 in accordance with another embodiment of the present invention. In particular, FIG. 2 is a detailed representation of a multiphase solar power system. The method of operation of the power system 200 is similar to the method of operation of the power system 100 of FIG. 1.

The power system 200 includes first, second, third, fourth photovoltaic panels/solar modules 202, 204, 206, 208 and the first, second, third, and fourth converters 102, 104, 106, 108. Further, the power system 200 includes the inductance bank 120, the capacitor bank 118, a plurality of current sensors 210, and a plurality of voltage sensors 212. The plurality of current sensors 210 and the plurality of voltage sensors 212 are disposed proximate to the first, second, third, and fourth converters 102, 104, 106, 108.

Further, the first, second, third, fourth photovoltaic panels/solar modules 202, 204, 206, 208 are coupled to the first, second, third, and fourth converters 102, 104, 106, 108 respectively. Each of the plurality of first, second, third, and fourth converters 102, 104, 106, 108 includes a first, second, third, and fourth output terminals 214, 216, 218, 220. Each of the first, second, third, and fourth output terminals 214, 216, 218, 220 correspond to one of a plurality of AC phases. In the illustrated embodiment, each of the first, second, third, and fourth output terminals 214, 216, 218, 220 include three AC phases.

The first, second, third, and fourth converters 102, 104, 106, 108 are coupled to each other in parallel. Further, the first, second, third, and fourth converters 102, 104, 106, 108 are coupled to the inductance bank 120 and the capacitor bank 118. In one embodiment, the inductance bank 120 includes at least one first inductor 121 corresponding to each phase and the capacitor bank 118 includes at least one capacitor 222 corresponding to each phase. Further, the plurality of second inductors 122 is coupled to the first, second, third, and fourth output terminals 214, 216, 218, 220 of the first, second, third, and fourth converters 102, 104, 106, 108, respectively.

The plurality of current sensors 210 is coupled to the first, second, third, and fourth output terminals 214, 216, 218, 220. Further, the plurality of voltage sensors 212 is coupled to the first, second, third, and fourth output terminals 214, 216, 218, 220. The first, second, third, and fourth converters 102, 104, 106, 108 are controlled based on outputs of the voltage sensors 212 and the current sensors 210. Further, the currents measured by the plurality of current sensors 210 and the voltages measured by the plurality of voltage sensors 212 are sampled by the corresponding ADCs, (not shown in FIG. 2). In one embodiment, the currents measured by the plurality of current sensors 210 and the voltages measured by the plurality of voltage sensors 212 are sequentially sampled by the corresponding ADCs. Further, single phase current sampled by the ADC may be used for determining the corresponding high frequency circulating harmonic current transmitted by the corresponding first, second, third, and fourth converters 102, 104, 106, 108. Moreover, the first, second, third, and fourth converters 102, 104, 106, 108 are further coupled to a medium voltage electrical grid 124 via at least one of the capacitor bank 118, the inductance bank 120, and the plurality of second inductors 122. The number of voltage sensors and current sensors may vary depending on the type of application.

Figure 3:
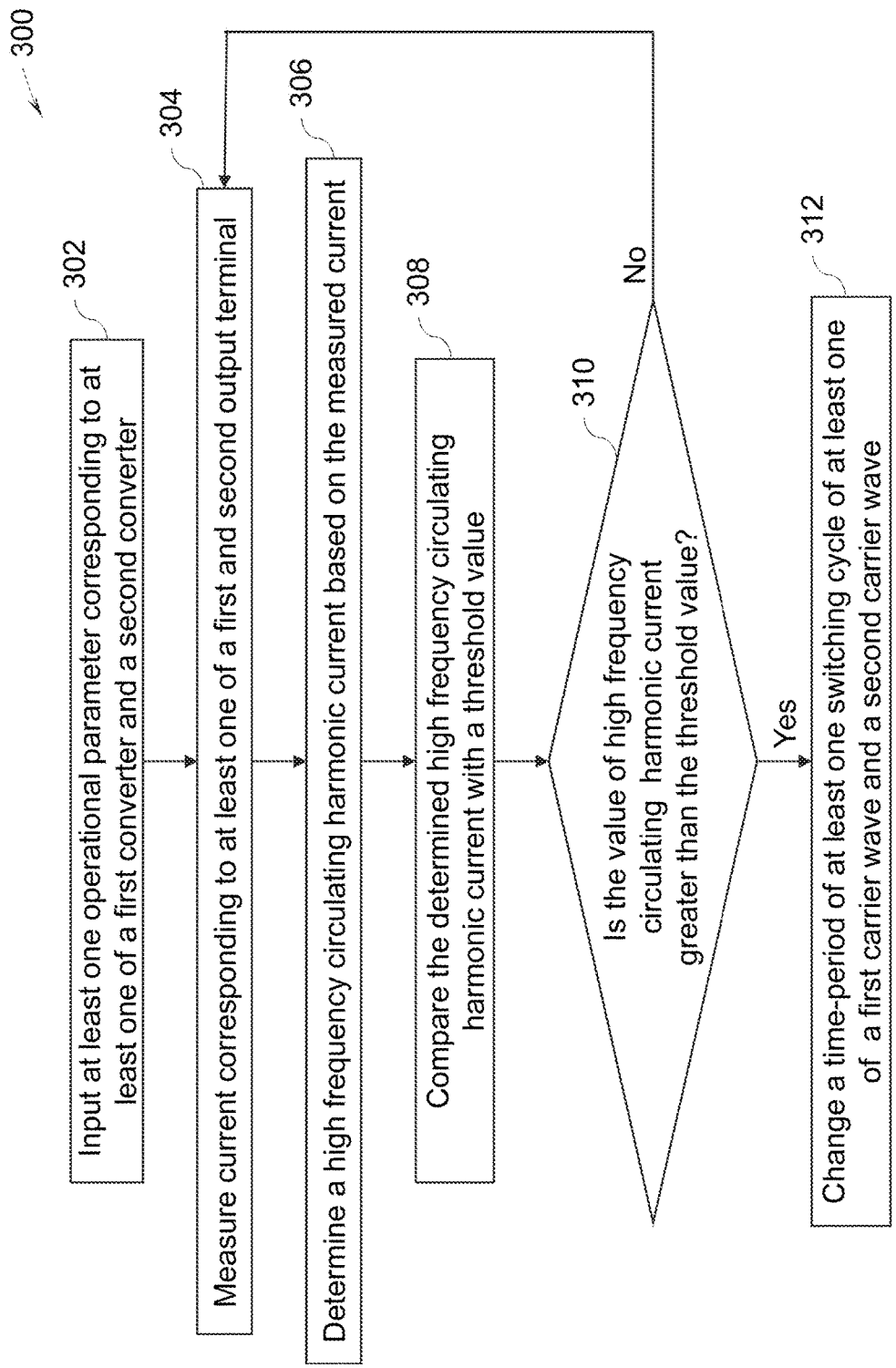
FIG. 3 is a flow chart illustrating an exemplary method for operation of a power system in accordance with certain embodiments of the present invention.

FIG. 3 is a flow chart illustrating an exemplary method for operation of a power system in accordance with embodiment of FIG. 1.

At step 302, at least one operational parameter of at least one of first, second, third, and fourth converters is input to first, second, third and fourth control units respectively. The at least one operational parameter may include a determined time interval for shifting of a first, second, third, and fourth carrier waves. For example, the determined time interval for shifting a frequency of the first carrier wave may be referred to as a determined first time interval. Similarly, the determined time interval for shifting of a frequency of the second carrier wave may be referred to as a determined second time interval. Further, the determined time interval for shifting of a frequency of the third carrier wave may be referred to as a determined third time interval and the determined time interval for shifting of a frequency of the fourth carrier wave may be referred to as a determined fourth time interval.

Additionally, the at least one operational parameter includes an assigned position of at least one of the first, second, third, and fourth converters. The term "assigned position of converter," as discussed herein, refers to a functionality of the corresponding converter. In one embodiment, a converter operates as a master converter or a slave converter based on the assigned position. For example, one converter may operate as a master converter and the remaining converters may operate as slave converters.

At step 304, currents corresponding to each of the first, second, third, and fourth output terminals are sampled. In one embodiment, phase currents of the first, second, third, and fourth output terminals are sampled sequentially. More particularly, the first control unit sequentially samples different phase currents at the first output terminal. In a similar manner, the second control unit, the third control unit, and the fourth control unit sample phase currents corresponding to the second output terminal, the third output terminal, and the fourth output terminal respectively.

At step 306, a high frequency circulating harmonic current is determined based on the sampled currents by a HRMSDU. Particularly, the first HRMSDU determines a first high frequency circulating harmonic current based on the current corresponding to one phase of the first output terminal. In a similar manner, the second HRMSDU, the third HRMSU, the fourth HRMSDU determine the second, third, and fourth high frequency circulating harmonic currents respectively.

At step 308, the value of the high frequency circulating harmonic current is compared with a threshold value. Particularly, the value of the first high frequency circulating harmonic current is compared with a first threshold value. In a similar manner, the values of the second, third, and third high frequency circulating harmonic current are compared with a second, third, and fourth threshold values respectively. In one embodiment, the first, second, third, and fourth threshold values have a same value.

At step 310, a check is done to determine if the value of the high frequency circulating harmonic current is greater than the threshold value. Particularly, a check is done to determine if the value of the first high frequency circulating harmonic current is greater than the first threshold value. Similarly, a check is done to determine if the value of the second, third, and fourth high frequency circulating harmonic currents are greater than the second, third, and fourth threshold value respectively. In one embodiment, with reference to each of the first, second, third, and fourth converters, if the value of the corresponding high frequency circulating harmonic current is greater than the corresponding threshold value, the control shifts to step 312, else, the step 304 is repeated.

At step 312, a time-period of at least one switching cycle of the carrier waves of the corresponding converter is controlled. In one embodiment, the time-period of at least one switching cycle of the first, second, third, and fourth carrier waves is controlled based on the at least one operational parameter and the corresponding determined harmonic current. As a result, the first, second, third, and fourth carrier waves are synchronized with respect to each other resulting in reduction of flow of high frequency circulating harmonic current.

The time-period of at least one switching cycle of each of the first, second third and fourth carrier waves is controlled based on the determined first time interval, the determined second time interval, the determined third time interval, and the determined fourth time interval, respectively. Particularly, the time-period of at least one switching cycle of the first carrier wave is changed for a determined first time interval $t_1$. In a similar manner, the time-period of at least one switching cycle of the second, third, fourth carrier waves are changed for the determined second, third, and fourth time intervals $t_2$, $t_3$, and $t_4$, respectively. Subsequently, the time-period of at least one switching cycle of the first carrier wave is again changed for the determined first time interval $t_1$, the time-period of at least one switching cycle of the second carrier wave is again changed for the determined second time interval $t_2$ and so on till the value of the corresponding high frequency circulating harmonic currents are less than the corresponding threshold values. In one embodiment, the determined first, second, third, and fourth time intervals $t_1$, $t_2$, $t_3$, and $t_4$ are non-overlapping time intervals. In such an embodiment, the time-period of the at least one switching cycle of the first carrier wave, the second carrier wave, the third carrier wave, and the fourth carrier wave waves are changed in a sequential manner.

In another embodiment, the time-periods of the at least one switching cycle of the first carrier wave, the second carrier wave, the third carrier wave, and the fourth carrier wave are changed simultaneously. In yet another embodiment, only the time-periods of the at least one switching cycle of the second carrier wave, the third carrier wave, and the fourth carrier wave are changed in a sequential manner. In one such embodiment, the time-period of the at least one switching cycle of the first carrier wave is not changed.

In one embodiment, a time-period of the at least one switching cycle of each of the first, second, third, and fourth carrier waves is changed based on the assigned position of each of the first, second, third, and fourth converters. In one embodiment, the first converter may operate as a master converter and the second, third, fourth converters may operate as slave converters. In such an embodiment, the time-periods of the at least one switching cycle of the carrier waves of the slave converters are changed and the time-period of the at least one switching cycle of the first carrier wave may not be changed. In such an embodiment, the first carrier wave may be used as a reference for changing the time-period of the at least one switching cycle of each of the second, third, and fourth carrier waves.

In addition, the time-periods of the at least one switching cycle of the carrier waves of the at least one converter are changed based on the plurality of time-instances transmitted to the first, second, third, and fourth control units. In one example, plurality of time instances, such as 9:01 AM, 9:02 AM, 9:03 AM, 9:04 AM may be transmitted to the first, second, third, and fourth control units.

By way of example, at 9:01 AM, each of the first, second, third, and fourth control units is assigned the time instance 9:01 AM. Hence, the first, second, third, and fourth control units have a common reference time. In one embodiment, the determined first time interval $t_1$ ranges from zero second to w seconds. In one embodiment, the time zero second may correspond to a time-instance, such as 9:01 AM and the time w seconds corresponds to 9:01 AM+w seconds. Therefore, the determined first, second, third, and fourth time intervals are defined based on the plurality of time instances transmitted to the corresponding the first, second, third and fourth control units. Thus, in one embodiment, time-periods of the at least one switching cycle of the first, second, third, and fourth carrier waves are changed in a sequential manner.

Therefore, total time required for synchronizing the carrier waves with respect to each other, if the plurality of time-instances is transmitted to the first, second, third, and fourth converters, is considerably less compared to the total time required for synchronizing carrier waves with respect to each other if the plurality of time-instances is not transmitted to the first, second, third, and fourth converters. In one embodiment, the steps 302, 304, 306, 308, 310, and 312 may be repeated with respect to each of the first, second, third, and fourth converters.

Figure 4:
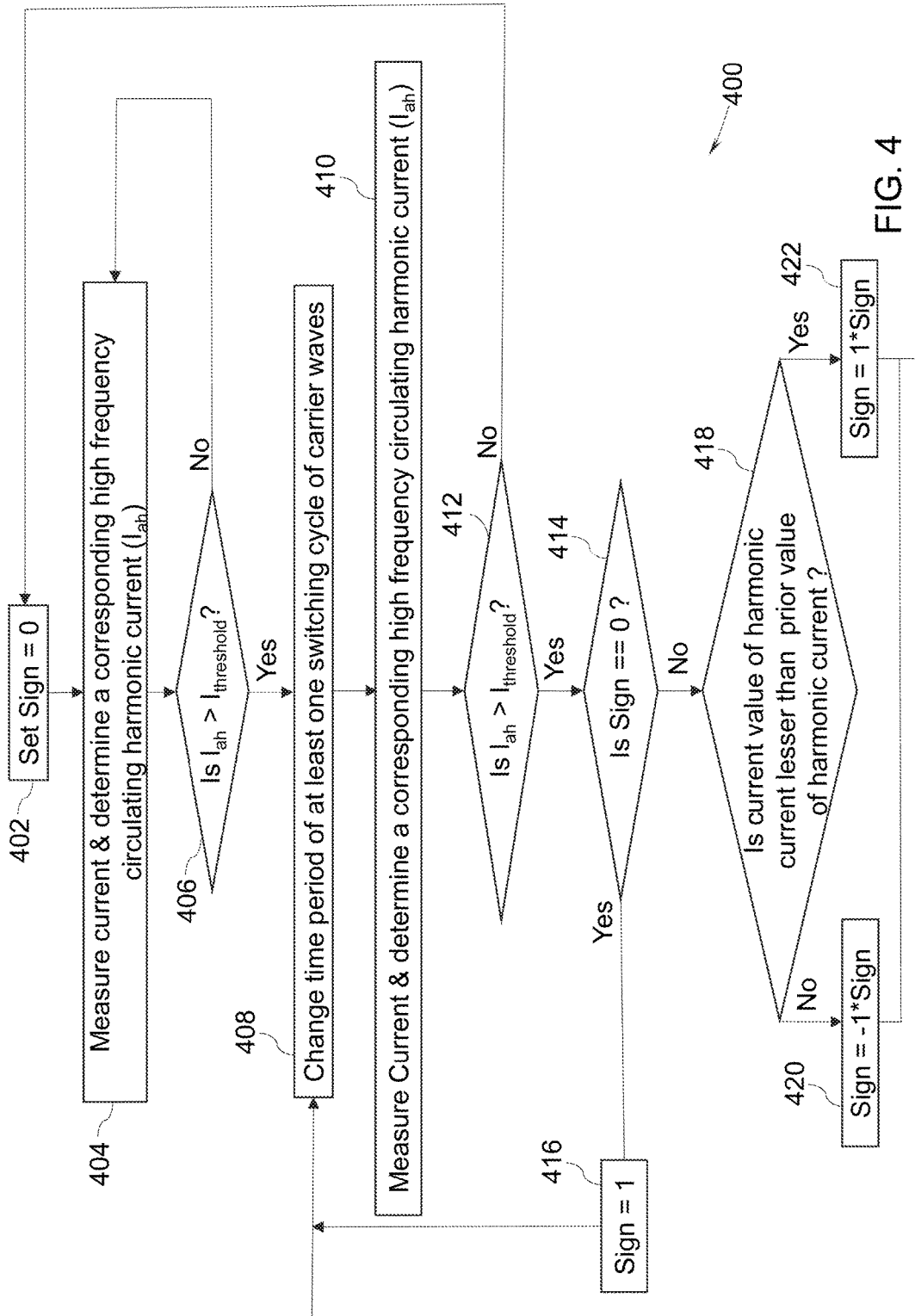
FIG. 4 is a detailed flow chart illustrating an exemplary method for operation of a power system in accordance with certain embodiments of the present invention.

FIG. 4 is a flow chart 400 illustrating an exemplary method of reducing high frequency harmonic circulating current transmitted by each of the converters in accordance with the embodiment of FIG. 1. In one embodiment, the steps 402, 404, 406, 408, 410, 412, 416, 418, 420, and 422 may be executed with respect to each of the first, second, third, and fourth converters. In one embodiment, the steps 402, 404, 406, 408, 410, 412, 416, 418, 420, and 422 may not be executed with respect to the first converter. In one embodiment, the first converter may be the master converter. For ease of explanation, the steps 402, 404, 406, 408, 410, 412, 416, 418, 420, and 422 are explained with respect to only single converter, such as the second converter.

At step 402, a constant 'Sign' of the second converter is set to a value '0' for the second converter. Further, at step 404, the currents of the second output terminal of the second converter are sampled. In one embodiment, different phase currents of the second output terminal are sampled in a sequential manner. The high frequency circulating harmonic currents transmitted by the second converter is determined by the second HRMSDU based on the current corresponding to one phase of the second output terminal.

Further, at step 406, a check is done to determine if the value of the high frequency circulating harmonic current is greater than a threshold value. The high frequency circulating harmonic current transmitted by the second converter may be referred to as a second high frequency circulating harmonic current. Further, the threshold value corresponding to the second converter may be referred to as a second threshold value. With reference to the second converter, the value of the second high frequency circulating harmonic current is compared with a second threshold value. If the value of the second high frequency circulating harmonic current is greater than the second threshold value, the control shifts to step 408. If the value of the second high frequency circulating harmonic current is lesser than the second threshold value, then step 404 is repeated.

At step 408, a time-period of at least one switching cycle each of the second carrier wave is changed. If the time-period of a switching cycle is $T_{sc}$, then the time-period of the at least one switching cycle is changed from $T_{sc}$ to $T_{sc}+ \text{Sign} \times dT_{sc}$. In one embodiment, $dT_{sc}$ is a fraction of $T_{sc}$. In one embodiment, the time-period of the at least one switching cycle of the second carrier wave is changed.

After changing the time-periods of at least one switching cycle of the second carrier wave, in one embodiment, the phase currents of the output terminals of the second converter are again sampled and the second high frequency circulating harmonic current is again determined as discussed with respect to step 404.

At step 410, the different phase currents of the second output terminal are sampled. The second high frequency circulating harmonic current is determined by the second HRMSDU based on single phase current corresponding to the second output terminal, which is sampled, in a similar manner as step 404.

Further, at step 412, a check is again done to determine if the value of the second high frequency circulating harmonic current determined at step 410 is greater than the second threshold value in a similar manner as the step 406. If the value of the second high frequency circulating harmonic current is greater than the second threshold value, the control shifts to step 414. If the value of the second high frequency circulating harmonic current is less than the second threshold value, then the control shifts back to 402, where the value of constant 'Sign' of the second converter is set again to '0.'

At step 414, a check is done to determine if the value of constant 'Sign' of the second converter is 0. If the value of 'Sign' of the second converter is not equal to 0, then control shifts to step 418. If the value of 'Sign' of the second converter is equal to 0, then control shifts to step 416, where the value of 'Sign' of the second converter is set equal to 1. Subsequent to step 416, the control shifts to step 408.

At step 418, a check is done to determine if a present value of the second high frequency circulating harmonic current is less than a prior value of the second high frequency circulating harmonic current. It should be noted herein that the prior value of second high frequency circulating harmonic current is determined at a first time instant and the present value of the second high frequency circulating harmonic current is determined at a second time instant, where the second time instant is after the first time instant. The prior value of the second high frequency circulating harmonic current may be referred to as a first value of the second high frequency circulating harmonic current. Further, the present value of the second high frequency circulating harmonic current may be referred to as a second value of the second high frequency circulating harmonic current. In particular, a check is done to determine if the value of the second high frequency circulating harmonic current determined at step 410 is less than the value of the second high frequency circulating harmonic current initially determined at step 404.

In one embodiment, a check is done to determine if the value of the second high frequency circulating harmonic current at the second time instant, for example, q+Δq seconds is less than the value of the second high frequency circulating harmonic current at that first time instant, for example, q seconds. For example, if the value of the second high frequency circulating harmonic current is greater than the second threshold value at the first time instant q and the value of constant 'Sign' of the second converter is equal to 1, the time-period of at least one switching cycle of the second carrier wave is changed from $T_{sc}$ to $T_{sc}+dT_{sc}$ at step 408. After changing the time-period at step 408, at the second time instant q+Δq, if the value of the second high frequency circulating harmonic current is greater than second threshold value, then a check is done to determine if the value of the second high frequency circulating harmonic current sampled at the first time instant q is greater than the value of the second high frequency circulating harmonic current sampled at the second time instant q+Δq. In particular, a check is done to determine if the value of the second high frequency circulating harmonic current is reducing with reference to change in time.

If the value of the second high frequency circulating harmonic current is increasing with reference to change in time, it may be indicative of the fact that the manner in which the time-period of at least one switching cycle of the second carrier wave changed at step 408 is not appropriate. In particular, if the value of the second high frequency circulating harmonic current is increasing with reference to change in time, it is indicative of the fact that changing the time-period of at least one switching cycle of the second carrier wave at step 408, resulted in the second carrier wave not being synchronized with respect to carrier waves of other converters.

If the value of the second high frequency circulating harmonic current is reducing with reference to change in time, it is indicative of the fact that the manner in which the time-period of at least one switching cycle of each of the second carrier wave, changed at step 408 is appropriate. In particular, if the value of second high frequency circulating harmonic current is reducing with reference to change in time, it is indicative of the fact that changing the time-period of at least one switching cycle of each of the second carrier wave at step 408, resulted in the second carrier wave being synchronized with carrier waves of other converters.

At step 418, if it is determined that a present value of the second high frequency circulating harmonic current is greater than a prior value of the second high frequency circulating harmonic current, the value of constant 'Sign' of the second converter is set to −1×Sign at step 420. Therefore, if constant 'Sign' of the second converter is equal to 1 initially, the time-period of at least one switching cycle of the second carrier wave is changed from $T_{sc}$ to $T_{sc}+dT_{sc}$. Subsequent to setting value of constant 'Sign' of the second converter to −1×Sign, at step 408, the time-period of at least one switching cycle of the second carrier wave is changed from $T_{sc}$ to $T_{sc}-dT_{sc}$.

At step 418, if it is determined that a present value of the second high frequency circulating harmonic current is less than a prior value of the second high frequency circulating harmonic current, the value of 'Sign' is set to 1×Sign at step 422. Therefore, if constant Sign is equal to 1 initially, at step 408, the time-period of at least one switching cycle of the second carrier wave is changed from $T_{sc}$ to $T_{sc}+dT_{sc}$. After setting value of constant 'Sign' to 1×Sign, at step 408, the time-period of at least one switching cycle of the second carrier wave is changed from $T_{sc}$ to $T_{sc}+dT_{sc}$.

The cycle is repeated until the second carrier wave is synchronized with respect to carrier waves of other converters. Once the second carrier wave is synchronized with respect to carrier waves of other converters, the value of the second high frequency circulating harmonic current is less than the second threshold value.

In accordance with the embodiments discussed herein, high frequency circulating harmonic current transmitted by any of the converters is reduced without use of a high-speed communication between the control units. Furthermore, the high frequency circulating harmonic current in the power system 100 is reduced without use of high inductance current limiting reactors.

The exemplary process steps such as those that may be performed by the exemplary system may be implemented by suitable code on a processor-based system such as a general-purpose or special-purpose computer. It should also be noted herein that some or all of the steps described herein in different orders or substantially concurrently. Furthermore, the functions may be implemented in a variety of programming languages including but not limited to C++ or Java. Such code may be stored or adapted for storage on one or more tangible, machine readable media such as on data repository chips, local or remote hard disks, optical disks (i.e. CDs or DVDs), memory or other media, which may be accessed by a processor-based system to execute the stored code. The tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A power system comprising:
   a first converter comprising a first output terminal;
   a first control unit coupled to the first converter;
   a second converter comprising a second output terminal, wherein the second converter is coupled in parallel to the first converter; and
   a second control unit coupled to the second converter, wherein the second control unit is configured to:
   measure a plurality of phase currents at the second output terminal;
   determine a harmonic current transmitted by the second converter based on single phase current of the plurality of measured phase currents, wherein the second control unit is configured to determine the harmonic current by determining a first value of the harmonic current transmitted by the second converter at a first time instant and a second value of the harmonic current transmitted by the second converter at a second time instant after the first time instant; and
   change a time-period of at least one switching cycle of a carrier wave of the second converter based on the determined harmonic current to synchronize with a carrier wave of the first converter, wherein the second control unit is configured to change the time-period by comparing the second value of the determined harmonic current transmitted by the second converter at the second time instant with the first value of the determined harmonic current transmitted by the second converter at the first time instant.

2. The power system of claim 1, further comprising a communication network coupled to the first and second control units, wherein the communication network is configured to transmit a plurality of time-instances to the first control unit and the second control unit.

3. The power system of claim 2, wherein the communication network comprises at least one of a global positioning system (GPS) based communication network, a wireless based communication network, and a local area network (LAN).

4. The power system of claim 1, further comprising a plurality of voltage sensors and a plurality of current sensors disposed proximate to the first and second converters.

5. The power system of claim 1, further comprising a capacitor bank coupled to the first converter and the second converter, wherein the capacitor bank comprises a plurality of capacitors corresponding to a plurality of alternating current phases.

6. The power system of claim 5, further comprising an inductance bank coupled to the capacitor bank.

7. The power system of claim 6, further comprising a plurality of second inductors operatively coupled to the first and second converters.

8. The power system of claim 7, further comprising a load, wherein the first and second converters are coupled to the load via one or more of: (a) the capacitor bank, (b) the inductance bank, or (c) the plurality of second inductors.

9. The power system of claim 8, wherein the load comprises at least one of a grid, a power consuming unit, and a mobile asset load.

10. The power system of claim 1, wherein the power system is at least one of a mobile power system, an uninterruptible power supply (UPS) based power system, a battery based power system, a solar based power system, and a wind based power system.

11. The power system of claim 1, wherein each of the first control unit and the second control unit comprises single sample and hold circuit configured to sequentially sample a corresponding plurality of phase currents.

12. A method for operating a power system comprising a first converter comprising a first output terminal and a second converter comprising a second output terminal, wherein the first converter is coupled to a first control unit and the second converter is coupled to a second control unit, the method comprising:
    measuring a plurality of phase currents at the second output terminal, by the second control unit;
    determining a harmonic current transmitted by the second converter based on a single phase current of the plurality of measured phase currents, by the second control unit, the harmonic current determined by determining a first value of the harmonic current transmitted by the second converter at a first time instant and a second value of the harmonic current transmitted by the second converter at a second time instant after the first time instant; and
    changing a time-period of at least one switching cycle of a carrier wave of the second converter, by the second control unit, based on the determined harmonic current to synchronize with a carrier wave of the first converter, wherein the time-period is changed by comparing the second value of the determined harmonic current transmitted by the second converter at the second time instant with the first value of the determined harmonic current transmitted by the second converter at the first time instant.

13. The method of claim 12, further comprising transmitting a plurality of time-instances to the first and second control units, via a communication network.

14. The method of claim 13, wherein the time-period of the at least one switching cycle is changed based on the plurality of transmitted time-instances.

15. The method of claim 12, wherein the time-period of the at least one switching cycle is changed by comparing the determined harmonic current transmitted by the second converter with a corresponding threshold value.

16. The method of claim 12, wherein the time-period of the at least one switching cycle is changed based on a determined time interval for shifting of a frequency of the carrier wave of the second converter and an assigned position of the second converter.

17. The method of claim 16, further comprising:
    measuring a plurality of phase currents at the first output terminal, by the first control unit;
    determining a harmonic current transmitted by the first converter based on single phase current of the plurality of measured phase currents at the first output terminal, by the first control unit; and changing a time-period of at least one switching cycle of the carrier wave of the first converter based on the determined harmonic current transmitted by the first converter, by the first control unit to synchronize with the carrier wave of the second converter.

18. A method for operating a power system comprising converters having output terminals with the converters coupled with corresponding control units, the method comprising:

measuring, by a first control unit of the control units, several phase currents at a first output terminal of the output terminals;

determining, by the first control unit, a harmonic current transmitted by a first converter of the converters based on a single phase current of the phase currents that are measured, wherein the harmonic current is determined by determining values of the harmonic current transmitted by the first converter at different times; and changing, by the first control unit, a time-period of at least one switching cycle of a carrier wave of the first converter based on harmonic current that is determined, wherein changing the time-period synchronizes the carrier wave of the first converter with a carrier wave of a second converter of the converters, wherein the time-period is changed by comparing the values of the harmonic current that is transmitted by the first converter at the different times.

19. The method of claim 18, further comprising:

measuring, by a second control unit, phase currents at a second output terminal of the output terminals;

determining, by the second control unit, a harmonic current transmitted by the second converter based on single phase current of the phase currents measured at the second output terminal; and changing, by the second control unit, a time-period of at least one switching cycle of the carrier wave of the first converter based on the harmonic current transmitted by the second converter to synchronize with the carrier wave of the second converter.

* * * * *